Feb. 28, 1933. T. J. KLEIN 1,899,508
RESILIENT PERCH FOR BIRD CAGES
Filed Sept. 2, 1930

INVENTOR
THOMAS J. KLEIN
BY Langdon Moore
ATTORNEY

Patented Feb. 28, 1933

1,899,508

UNITED STATES PATENT OFFICE

THOMAS J. KLEIN, OF CHICAGO, ILLINOIS

RESILIENT PERCH FOR BIRD CAGES

Application filed September 2, 1930. Serial No. 479,146.

This invention relates to improvements in perches for bird cages and more particularly to a resilient perch and means for attaching it to the bird cage in connection with the feed and water cups.

It is an object of this invention to provide a perch upon which the bird alights when feeding or drinking water, which perch is preferably resilient and is positioned by contact with the feed or water cup of the usual type secured in the usual manner to the wires of the bird cage. As the bird from time to time during the day feeds or drinks, it is particularly advantageous to resiliently support the feed or water perch, so that as the bird alights it will be necessary for him to exercise his muscles in obtaining a firm hold upon the perch.

It is another object of this invention to provide a perch of the type described which may be either rigidly attached to the feed or water cup of customary construction or may be an accessory sold independently of the cup, but adaptable to be inserted in any cage and held in position by attaching the cup to the cage.

With these and other objects in view, reference is made to the accompanying sheet of drawing which illustrates the preferred forms of this invention, with the understanding that minor detail changes may be made without departing from the scope thereof:

Figures 1, 2:
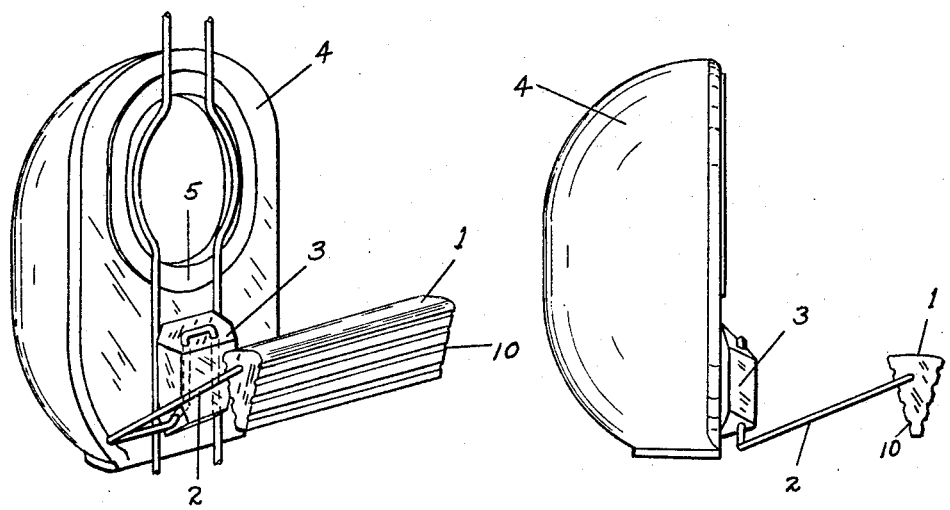
Figure 1 is a perspective view of one embodiment of this invention, illustrating the resilient perch carried upon the feed or water cup.
Figure 2 is a view in side elevation of Figure 1.

Feed and water cups for bird cages have been for many years of practically the same design and construction, such as illustrated upon the drawing of this application, and are provided with a flanged lug adapted to be received between adjacent wires of the cage and held in position thereby. It is customary in the manufacture of bird cages to provide adjacent wires diametrically opposite with slightly bent away portions through which the flanged lug of the cup may be inserted and then moved downwardly so that the parallel wires are engaged behind the flanges and position the cup. It is also customary in bird cages to provide a circular brace or part of the cage engaging the wires approximately an inch or inch and a half from the bottom of the cage and it is customary to depress the cup until the lugs rests upon this portion of the cage. This necessitates a separate feed and water perch to be positioned in the cage so that the bird may feed or drink from the cups. This invention contemplates a perch 1 preferably of the type illustrated in my prior Patent No. 1,747,476, February 18, 1930, or of the type illustrated in my pending application Serial No. 435,797, filed March 14, 1930, now Patent No. 1,879,-318, issued September 27, 1932, to which is engaged a resilient member or wire 2 bent in the form shown in Figure 1 of the drawing and attached to the lug 3 of the feed cup 4, preferably by passing the end of the wire through apertures provided therefor in the body of the lug, as shown and then bending the wire at right angles thereto as shown in Figure 2. A bird perch of this type secured in this manner to the feed or water cup may be readily passed through the enlarged opening 5 between the adjacent wires provided for the insertion of the feed cup lug and the feed cup then engaged by the wires by depressing the cup as shown in Figure 1.

Figure 3:
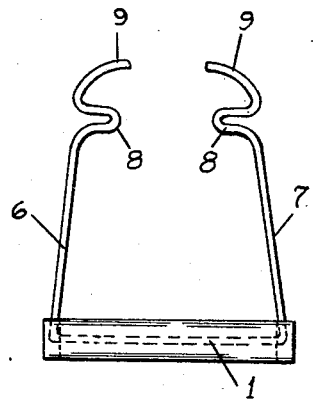
Figure 3 is a top plan view of a modified form of this invention.
Figure 4:
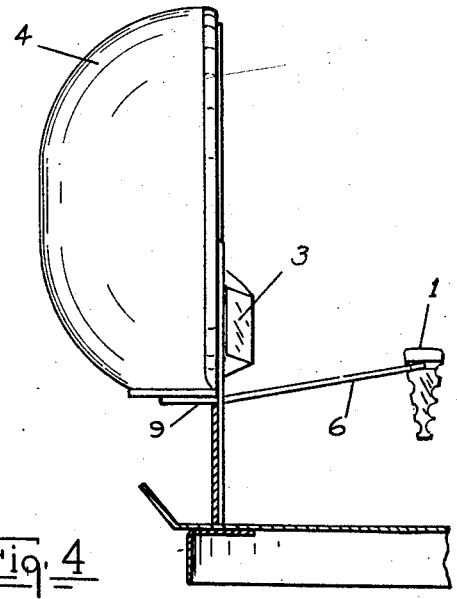
Figure 4 is a view in side elevation illustrating this form as held in position by the feed or water cup.

Figures 3 and 4 illustrate another form of this invention in which the bird perch 1 is resiliently mounted upon two wires 6 and 7, or by passing a single wire through the body of the perch and bending it over each end, as shown in Figure 3, providing converging portions 6 and 7. At the desired distance of the perch from the cage wires each portion 6 and 7 is bent inward toward the other portion and then both portions are bent away from each other and then curved toward each other as shown in Figure 3. The normal distance between the reentrant portions 8 is greater than the normal distance between the wires of the bird cage, so that these portions may be passed vertically between the wires and then when turned to a horizontal position will engage a wire in each reentrant portion and the curved exterior portions 9 are preferably of such a shape that when the feed or water cup is positioned above the attached perch, the bottom thereof will be engaged by the portion 9.

In the cage of customary commercial construction this form of resilient perch may be engaged with two wires forming the opening for the insertion of the cup lug and depressed to rest upon the customary brace or bottom of the cage so that when the cup is positioned it will engage the portion 9 of the perch support and normally maintain the portions 6 and 7 in horizontal relation, and resiliently support the perch 1 in the desired position.

It is preferable to employ the perch 1, as illustrated, which is of greater depth than width, curved at the top with the sides converging toward the bottom and in addition provided with a plurality of longitudinal grooves 10 upon each sloping surface, forming alternate ridges and depressions, somewhat in the manner of a washboard, which are customarily engaged and disengaged by the toe nails of the bird in alighting and maintaining its balance while feeding or drinking. This constant engagement with the washboard-like surface of the perch automatically trims the toe nails.

What I claim is:

1. A resilient feed and water perch for bird cages having a feed or water cup and means for attaching the cup to the exterior of the cage, comprising a short bar adapted to be positioned adjacent the cup upon the interior of the cage, and a resilient support therefor attached at one end to the bar and engaged at the other end by the cup to hold the bar across the front of the cup, said engagement holding said bar in place.

2. A resilient feed and water perch for bird cages having a feed or water cup and means for attaching the cup to the exterior of the cage, comprising a short bar adapted to be positioned adjacent the cup upon the interior of the cage, and a resilient support therefor attached to the bar and engaged by the cup, said support having spring arms extending from each end of the bar with the free ends thereof provided with means to engage the wires of the cage and contact the cup.

3. A resilient feed and water perch for bird cages having a feed or water cup and means for attaching the cup to the exterior of the cage, comprising a short triangular bar of greater depth than width having corrugated sides adapted to be positioned adjacent the cup upon the interior of the cage, and a resilient support therefor attached to the bar and engaged by the cup, said support having spring arms extending from each end of the bar with the free ends thereof provided with means to engage the wires of the cage and contact the cup.

4. A resilient feed and water perch for bird cages having a feed or water cup and means for attaching the cup to the exterior of the cage, comprising a short triangular bar of greater depth than width, curved at the top, and with corrugated sides sloping toward the bottom, adapted to be positioned adjacent the cup upon the interior of the cage, and a resilient support therefor attached to the bar and engaged by the cup, said support having spring arms extending from each end of the perch with the free ends thereof provided with means to engage the wires of the cage and contact the cup.

THOMAS J. KLEIN.